SYSTEM FOR DISPLAY AND CONTROL OF LOGIC ELEMENT OUTPUTS
Filed Oct. 22, 1965
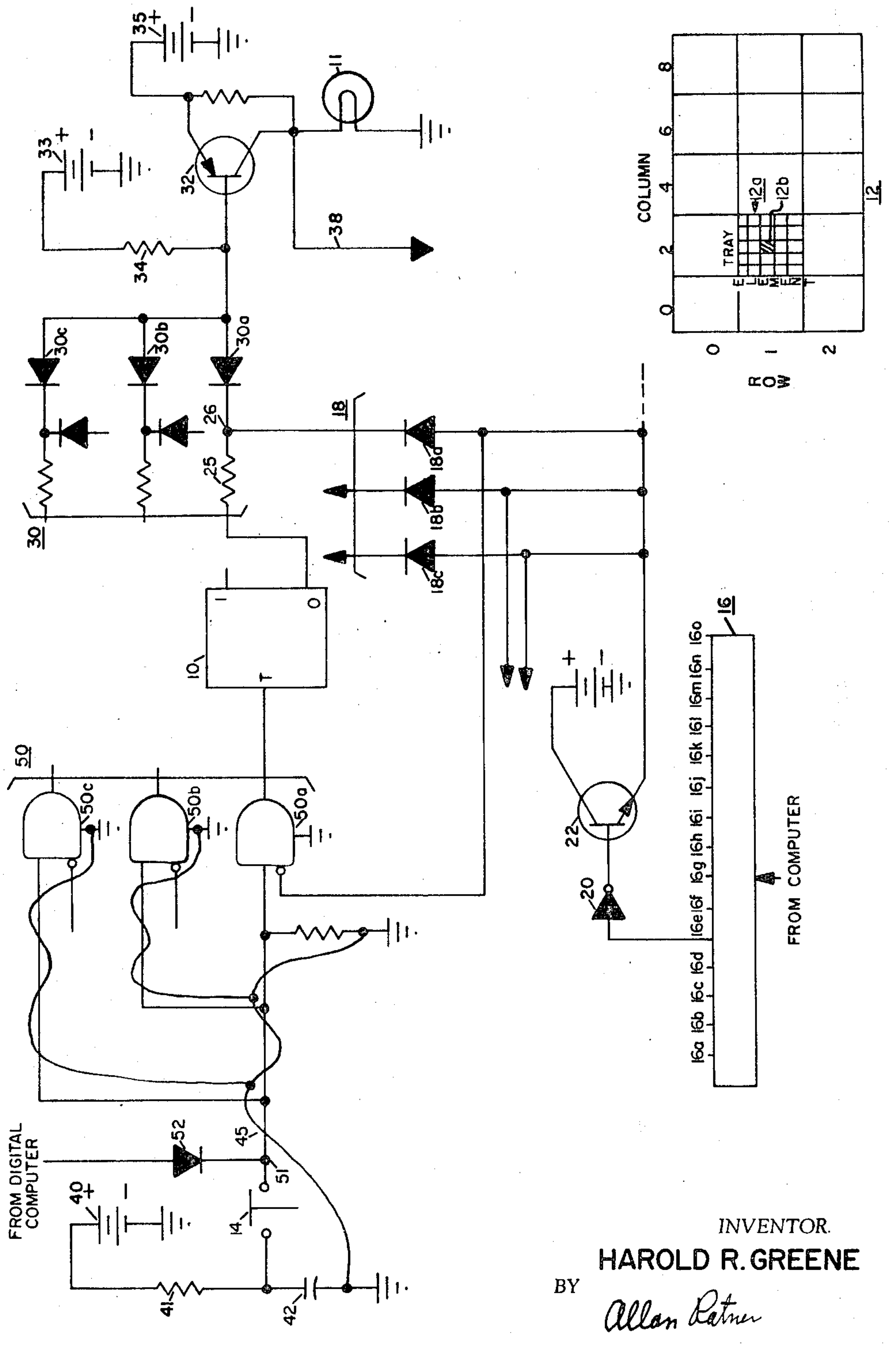
INVENTOR.
HAROLD R. GREENE
BY
Allan Ratner United States Patent Office 3,444,518
Patented May 13, 1969

3,444,518

SYSTEM FOR DISPLAY AND CONTROL OF LOGIC ELEMENT OUTPUTS

Harold R. Greene, New Shrewsbury, N.J., assignor to Electronic Associates Inc., Long Branch, N.J., a corporation of New Jersey Filed Oct. 22, 1965, Ser. No. 501,830
Int. Cl. H04q *1/00*
U.S. Cl. 340—147 12 Claims

ABSTRACT OF THE DISCLOSURE

The output state of a single one of a plurality of logic elements in a plurality of groups of logic elements is automatically selected and displayed and controlled by applying an output signal to one of a plurality of AND gates which select the group. Activation of the AND gate selects the display device and the control circuit for the element as well as the element itself.

This invention relates to electronic computing apparatus and more particularly to displaying the output states of logic elements.

Many general purpose analog computers have had the limitations of being unable to provide logical decisions, accept high speed input data or produce high speed output data. In this way general purpose analog computers have been limited in their ability to solve problems requiring logical decisions or requiring high speed transmission of data from different sources. Accordingly analog computers have been provided with a plurality of logic elements forming a "logic machine." The logic elements provide digital logic and are specifically designed for controlling the analog computer and to provide it with logical decisions as well as a high speed data processing capability.

In order to provide a convenient means for patching or interconnecting the logic elements of the logic machine a method similar to that used on analog computers has been used. Specifically patch panels have been used having a plurality of holes representing associated logic elements and with the holes adapted to receive patchcords. The patch panel may be separated into rows and columns with each row column area defining a group of logic elements. In many prior logic machines it has heretofore not been possible to conveniently display the output states of each of the logic elements in a selected group or row column area on a single display area. In addition it has not been possible to switch the stable states of those logic elements which are flip-flops after their output states have become known.

Accordingly an object of the present invention is to select one group of a plurality of groups of logic elements and to display the output states of those logic elements.

Another object of the present invention is to switch the stable state of a flip-flop logic element in a group of logic elements selected from a plurality of groups of logic elements.

In accordance with the present invention there is provided a display system having a plurality of logic elements arranged in groups for displaying the output states of a selected one of the groups. A plurality of AND gate means are provided a different one for each of the groups with each of the AND gate means being connected to outputs of the individual logic elements of its associated group. A plurality of display means are each associated with a predetermined logic element position in each of the groups. An individual OR gate is connected between the output of each of the logic elements and the display means corresponding to the position of that logic element. There is further provided an address register having outputs each connected to a differing one of the AND gate means for enabling only one of the AND gates at any one time. In this manner only the group associated with an enabled AND gate means has the output states of its respective logic elements transmitted to the display means. Thus, one group of a plurality of groups of logic elements is selected and the output states of those logic elements are displayed.

Further in accordance with the invention there is provided a plurality of state switching means each associated with a predetermined logic element position. A different one of a plurality of input AND trigger gate means is connected between a trigger input of a logic element and the state switching means corresponding to the position of that logic element. The address register outputs are effective to enable the input AND trigger gate means associated with the logic elements of a selected group. In this manner the stable states of flip-flop logic elements in the selected group may be selectively switched upon actuation of the switching means.

For further objects and advantages of the invention and for typical embodiments thereof, reference is to be had to the following description taken in conjunction with the accompanying drawing which schematically illustrates a display system embodying the invention.

Referring now to the drawing there is generally shown a patch panel 12 of a logic machine which may be a portion of a hybrid analog-digital system. The logic machine comprises a plurality of logic elements such as flip-flops, AND gates, OR gates, etc. which are used for logic purposes as for example to control the mathematical capabilities of an analog computer as described in patent application Ser. No. 334,107 by D. A. Baumann et al., filed Dec. 30, 1963 for Computing System and assigned to the same assignee as the present invention and in Electronic Analog and Hybrid Computer by Korn and Korn, McGraw-Hill, 1964 at pages 10–10 et seq. and chapter 11.

The patch panel may be separated into rows and columns with each row column area defining a group of logic elements. Specifically a row column area may comprise a plurality of trays with each tray including a plurality of logic elements. Thus as shown in the drawing row column area 12*a* includes five trays with five logic elements within each tray. The arrangement of a patch panel into row column areas is described in the foregoing Electronic Analog and Hybrid Computer text and in patent application Ser. No. 455,470 by A. G. Tonnesson, filed May 13, 1965 for Readout System and assigned to the same assignee as the present invention.

Accordingly there may be a total of twenty-five individual positions in each row column area with each position in each row column area having a corresponding position in each of the other row column areas. In accordance with the invention any one of the row column areas may be selected to display the logic states of its respective logic elements and there is provided a light 11 and a switch 14 each in number equal to the number of positions in a row column area and each associated with a particular position. Thus for any selected row column or group of logic elements lights 11 indicate the output state of the logic elements having corresponding positions within the selected row column area.

In addition an output to a digital computer is associated with each of the lights 11 so that the output of the logical elements in each of the positions of the selected row column area may be read out to a digital computer. Additionally switches 14 are associated with each predetermined position in the row column area and if a flip-flop is located at a position then upon actuation of a respective switch 14 the associated flip-flop is switched from one to the other of its stable states. On the other hand if a flip-flop is not located at that position the switch will have no effect on that logic element.

In order to select a desired row column area such as row column area 12*a* there is provided a digital address register 16 having fifteen outputs 16*a*–16*o*, one for each of the row column groups. Registers are well known in the art and may be operated by a digital computer or switches to provide a 1-state output on one and only one of its fifteen output terminals 16*a*–16*o* each associated with a different row column area. In this manner one and only one of the row column areas is selected. For the purpose of this explanation a 1-state or up output will be considered to be a positive potential as for example plus 2 volts to plus 5 volts and a 0-state or down output will be considered to be ground potential. Each of the output terminals 16*a*–16*o* is connected to a separate group of AND gates with each group corresponding to a different row column area. For the purpose of explanation only the row column area 12*a* corresponding to output terminal 16*e* and AND gate group 18 will be described in detail and it will be understood that the remaining row column areas operate in similar manner with a separate group of AND gates being connected to each of the remaining output terminals 16*a*–16*o*.

If it is assumed that terminal 16*e* produces an output in a 1-state then a positive potential is applied through an inverter 20 to produce a 0-state output which then flows by way of an emitter follower transistor 22 to the anodes of AND gate diodes of 18*a*–18*c* of AND gate group 18. With ground potential or a 0-state signal applied to their anodes, AND gate diodes 18*a*–18*c* are turned OFF and thus the respective gates are enabled thereby to select row column area 12*a*. It will be understood that each of the AND gate diodes of group 18 is associated with a different logic element located in row column area 12*a*. Thus, a maximum of tweny-five diodes are necessary, one for each of the logic elements if a logic element is located in each of the possible positions in row column area 12*a*. For simplicity only three diodes 18*a*–18*c* have been shown.

The cathode of each of AND gate diodes 18*a*–18*c* is connected by way of a junction 26 and a respective isolating resistor 25 to the 0-side of its respective logic element. Thus as shown in the drawing if the 0-side output of flip-flop 10 is up or in a 1-state then junction 26 is also in a 1-state. Thus with a positive potential at its cathode and ground potential at its anode, diode 18*a* is maintained turned OFF. In similar manner if the 0-side of flip-flop 10 is down or in a 0-state then junction 26 is also in a 0-state and diode 18*a* is also maintained turned OFF. In this manner a junction 26 of a logic element in a selected row column area provides a signal corresponding to the output signal of a respective logic element. On the other hand for the remaining row column areas corresponding to outputs 16*a*–16*d* and 16*f*–16*j* of register 16 the respective AND gate groups are not enabled. Thus the corresponding diodes are turned ON and the junctions 26 are prevented from changing in state and are clamped to a 1-state.

The signal at junction 26 is applied by way of an OR gate 30*a* to an input of a transistor 32 connected for switching an energization circuit of lamp 11. As previously described lamp 11 is associated with a predetermined position in each row column area as for example position 12*b*. OR gate diode 30*b*, 30*c*, etc. are each associated with the same lamp circuit and are connected to different logic elements each in positions corresponding to position 12*b* in the remaining row column areas. For example, since there are fifteen row column areas illustrated then there may be fifteen logic elements in positions similar to that of 12*b* and thus fifteen diode OR gates are required.

PNP transistor 32 is normally turned OFF by a biasing source traced from the positive side of a battery 33, a bias resistor 34 and to the base of transistor 32. Thus if the junction 26 is in a 1-state which indicates that the 0-side of flip-flop 10 is in a 1-state then that positive going potential is effective to turn OFF diode 30*a* and thus the conductivity state of transistor 32 is not changed. In this manner with a 1-state at juncion 26 an energizing circuit for lamp 11 is open since transistor 32 is maintained turned OFF. On the other hand when junction 26 is in a 0-state or at ground potential then current flow may be traced by way of the positive side of a collector supply battery 35, the emitter and base of transistor 32, OR gate diode 30*a*, isolating resistor 25 to ground potential at the 0-side of logic element 10.

In this manner driver transistor 32 is turned ON and current flow may be traced from the collector battery 35 through transistor 32 and the lamp 11 to ground for providing a current path for energization of lamp 11 thereby lighting it. Thus, lamp 11 is lit when the 0-side of element 10 is in a 0-state which corresponds to its 1-side being in a 1-state. In addition, with transistor 32 turned ON the positive potential of battery 35 is applied as 1-state output data to a digital computer by way of a conductor 38.

It will now be understood that in accordance with the invention in a selected row column area or group a digital element 10 at a position 12*b* corresponding to lamp 11 is effective to light the lamp and provide a 1-state data output when its 0-side is in a 0-state which corresponds to its 1-side being in a 1-state. In other words, for the patch panel 12, if the row column area 12*a* has been selected and the logic element 10 at position 12*b* produces a 1-state output, then a lamp 11 corresponding to that position will light and a 1-state output will be provided as output data to a digital computer.

It may be desirable by the computer operator who sees that the lamp 11 is lit or not lit and if a flip-flop is located at that position in the selected row column area to switch that flip-flop from the stable state it is then into its other stable state. This switching or complementing of flip-flop element 10 may be achieved by pressing momentary push button 14 which corresponds to the desired position in a selected group. As previously described, lamp 11 may correspond to position 12*b* and push button 14 may also correspond to that position and the switch and lamp may be physically located adjacent each other for the operator's convenience.

Before momentary push button 14 is depressed it will be seen that a charging circuit may be traced by way of the positive side of a battery 40 and a resistor 41 to one side of a charging capacitor 42 the other side of which is connected to ground. This charging circuit is effective to apply a positive potential to the upper plate of capacitor 42 with respect to ground. When the button 14 is depressed a discharging circuit may now be traced by way of the capacitor 42 through the switch 14 to a twisted pair tapped transmission line 45 to one input of an input AND trigger gate 50*a*. Gate 50*a* is one of a plurality of an AND input trigger gate group with each of the gates 50*a*–50*c*, etc. being associated with a different element having the same relative position in the differing row column areas. With fifteen row column areas, fifteen gates 50 may be provided but only three gates have been shown.

Since it has been assumed that row column area 12*a* has been selected and thus a 0-state signal is applied by way of emitter follower transistor 22 to the other input of AND gate 50*a* thereby to enable that AND gate. In this manner an output is produced from AND gate 50*a* which is applied to the trigger input of flip-flop 10 thereby to switch that flip-flop from its present stable state to the other of its stable states.

Transmission line 45 may be tapped at various taps along its length with high impedance input taps which are applied as inputs to the differing AND gates 50*b*, 50*c*, etc. Transmission line 45 is terminated in its characteristic impedance and produces no reflection in manner similar to that explained in detail in patent application Ser. No. 276,769 by Harold R. Greene, filed Apr. 30, 1963 for Transmission System and assigned to the same assignee as the present invention now U.S. Patent 3,302,035.

Switch 14 and its related circuitry operate to prevent reflection in the following manner. When the switch is depressed the capacitor 42 is fully discharged and its potential goes to substantially zero potential. When the switch is released it may possibly "bounce" and make intermittent contact as a result of its construction which includes a spring. However, the value of the resistor 41 is selected so that the R.C. time constant is substantially longer than the inherent bouncing of the switch. For example the value of resistor 41 may be selected to be many times larger than the characteristic impedance of the transmission line 45. In this manner a steep wavefront is generated when switch 14 is depressed and a pulse width is generated that is substantially of short time duration as a result of the discharge of the capacitor into a low impedance transmission line 45 as for example 100 ohms.

Alternately input data from a digital computer may be applied by way of a diode 52 to a junction 51 to the transmission line 45. In this manner a signal is applied to trigger the logic element 10 in the selected group in place of actuating switch 14. It will be understood that the repetition rate is not increased by a long time constant as a result of the switch 14 being normally open and the long time constant of the charging circuit of capacitor 42 is isolated from the connection to the digital computer.

It will now be understood that in accordance with the invention a particular row column area of a patch panel 12 may be selected by means of a digital address register 16 with each output 16*a*–16*o* of the register 16 being connected to different groups of AND gate diodes with each group being driven by a respective emitter follower. Only part of one of the groups has been shown, viz. group 18. Each of the groups of AND gates has a respective diode for each of the logic elements within its row column area. Thus when a row column area or group of logic elements is to be selected its associated AND gate group diodes are enabled. Each of the logic elements within a group has associated therewith an OR gate and an input trigger AND gate. Its OR gate is connected to one of the lamp circuits corresponding to its relative position in the row column area and its input trigger AND gate is connected to a switch 14 corresponding to that same relative position. In this manner all of the logic elements corresponding to position 12*b* for example have their group OR gate diodes 30*a*, 30*b*, 30*c*, etc. connected to transistor 32. All of the group of gates 50*a*, 50*b*, 50*c*, etc. corresponding to position 12*b*, for example, have an input connected to switch 14.

It will be seen that for each of the lamp circuits 11 there is provided a differing group of OR gate diodes 30 with each diode of the group being respectively connected to logic elements corresponding to the relative position of a respective lamp. In similar manner for each of the switches 14 there is provided a differing group of input trigger gates 50 with each gate of the group being respectively connected to flip-flops having positions corresponding to that of a respective switch 14. In this manner, for the patch panel 12, for example, there may be provided fifteen lamps 11, fifteen switches 14, fifteen groups of OR gates 30 and fifteen groups of gates 50.

In accordance with the invention the output states of the logic elements in selected row column areas may each be read out on a single group of display devices 11. This selection is achieved by the use of a single register 16 having a plurality of outputs each connected to a different group of AND gates 18.

What is claimed is:

1. A display system having a plurality of logic elements arranged in groups for displaying the output state of a selected one of said groups comprising a plurality of AND gate means a different one for each of said groups, means connecting each of said AND gate means to outputs of the individual logic elements of its associated group, a plurality of display means each associated with a predetermined logic element position in each of said groups, a plurality of OR gate means a differing one being connected between said output of each of said logic elements and the display means corresponding to the position of that logic element, and a register having outputs each connected to a differing one of said AND gate means for enabling only one of said AND gate means at any one time whereby only the logic elements of the group associated with the enabled AND gate means is selected to have its output states transmitted to said display means.

2. The display system of claim 1 in which there is provided a plurality of state switching means each associated with a predetermined logic element position, a plurality of input AND trigger gate means a differing one being connected between a trigger input of each logic element and the switching means corresponding to the position of that logic element, and means connected to said register outputs for enabling the input AND trigger gate associated with the logic elements of a selected group whereby the stable states of those logic elements may be selectively switched upon actuation of said switching means.

3. The display system of claim 2 in which each of said state switching means includes a transmission line terminated in its characteristic impedance, and means for tapping each of said transmission lines at selected points for connecting an input to an input AND trigger gate means associated with the respective state switching means.

4. The display system of claim 3 in which each of said state switching means includes capacitive means, and means for charging said capacitive means during the time said switching means is not actuated and for discharging said capacitive means into its associated transmission line when said switching means is actuated.

5. The display system of claim 4 in which each of said switching means includes a momentary push button and in which the time constant of said capacitive means is substantially longer than the inherent bouncing of said push button.

6. A display system having a plurality of logic elements arranged in groups for displaying the output states of a selected one of said groups and for selectively switching the stable states of those logic elements which are flip-flops in a selected group comprising a plurality of first AND gate means a different one for each of said groups, means connecting each of said first AND gate means to outputs of the individual logic elements of its associated group, a plurality of display means each associated with a predetermined logic element position in each of the groups, a plurality of state switching means each associated with each of said predetermined logic element positions, a plurality of OR gate means a differing one being connected between said output of each of said logic elements and a display means corresponding to the position of that logic element, register means having a plurality of outputs each connected to a differing one of said AND gate means for enabling only one of said first AND gate means at any one time for selecting the logic elements of the group associated with the enabled first AND gate means to have its output states transmitted to said display means, a plurality of second AND gate means a differing one being connected between a trigger input of each logic element and the state switching means corresponding to the position of that logic element, and means connected to said outputs of said register means for enabling only those second AND gate means associated with the logic elements of a selected group whereby the stable states of a flip-flop logic element may be selectively switched by means of said switching means.

7. The display system of claim 6 in which each of said state switching means includes a transmission line terminated in its characteristic impedance, and means for selectively tapping said transmission line at differing points for connecting an input to a second AND gate means associated with the associated switching means.

8. The display system of claim 7 in which each of said state switching means includes a capacitor, and source means for charging said capacitor during the time said switching means is not actuated and for discharging said capacitor by way of said switching means into its associated transmission line when said switching means is actuated.

9. The display system of claim 8 in which each of said switching means includes a momentary push button and in which the time constant of said source means and capacitor is substantially longer than the inherent bouncing of said switch.

10. A system having a plurality of logic elements arranged in groups for selecting one of said groups and for selectively switching the stable states of those logic elements which are flip-flops comprising a plurality of state switching means each associated with a predetermined logic element position in each of said groups, a plurality of input AND trigger gate means a differing one being connected between a trigger input of a flip-flop logic element and the switching means corresponding to the position of that logic element, a register having a plurality of outputs a different one associated with each of said groups and only one of said outputs producing an energizing group selecting signal at any one time, and means connecting each of said register outputs to its associated input AND trigger gate means for enabling the input AND trigger gate means of a selected group whereby the stable states of the flip-flop logic elements of the selected group may be selectively switched.

11. The system of claim 10 in which each of said state switching means includes a transmission line tapped at selected points for connection to input AND trigger gate means associated with the respective switching means.

12. The system of claim 11 in which each of said state switching means includes capacitive means, means for charging said capacitive means during the time said switching means is not actuated and for discharging said capacitive means into its associated transmission line when said switching means is actuated.

References Cited

UNITED STATES PATENTS

| | | | |
|---|---|---|---|
| 3,219,991 | 11/1965 | Freitas | 340—213.2 |
| 3,248,721 | 4/1966 | Cockrell et al. | 340—147 XR |
| 3,307,166 | 2/1967 | Slack et al. | 340—213.2 XR |

DONALD J. YUSKO, *Primary Examiner.*

U.S. Cl. X.R.

340—213.2